(12) United States Patent
Smirnov (10) Patent No.: US 8,804,279 B2
(45) Date of Patent: Aug. 12, 2014

(54) SPINDLE MOTOR AND HARD DISK DRIVE INCLUDING THE SAME

(71) Applicant: Samsung Electro-Mechanics Co., Ltd., Suwon (KR)

(72) Inventor: Viatcheslav Smirnov, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/771,587

(22) Filed: Feb. 20, 2013

(65) Prior Publication Data

US 2014/0177094 A1  Jun. 26, 2014

(30) Foreign Application Priority Data

Dec. 21, 2012 (KR) .................. 10-2012-0151453

(51) Int. Cl.
 *G11B 19/20* (2006.01)
 *F16C 33/10* (2006.01)

(52) U.S. Cl.
 USPC .................... 360/99.08; 310/90; 384/107

(58) Field of Classification Search
 CPC .... F16C 17/107; F16C 33/103; F16C 33/745; F16C 2370/12; F16C 33/107; H02K 7/085; H02K 7/08; G11B 19/2036; G11B 19/2009; G11B 19/20
 USPC ............... 360/98.07, 99.08; 310/90, 156.12; 384/100, 107
 See application file for complete search history.

(56) References Cited

U.S. PATENT DOCUMENTS

| | | |
|---|---|---|
| 2011/0031833 A1 | 2/2011 | Yu |
| 2012/0013213 A1* | 1/2012 | Kim .............................. 310/90 |
| 2012/0017225 A1 | 1/2012 | Smirnov et al. |
| 2012/0043842 A1 | 2/2012 | Choi |
| 2012/0162820 A1* | 6/2012 | Hoffmann et al. ......... 360/99.08 |
| 2013/0039609 A1* | 2/2013 | Kim et al. .................... 384/112 |
| 2013/0121627 A1* | 5/2013 | Jun ............................. 384/115 |
| 2013/0330029 A1* | 12/2013 | Kwon .......................... 384/121 |
| 2014/0010065 A1* | 1/2014 | Kimura et al. ............... 369/264 |
| 2014/0016229 A1* | 1/2014 | Sekii et al. ................ 360/99.08 |

FOREIGN PATENT DOCUMENTS

| | | |
|---|---|---|
| KR | 10-2006-0114883 | 11/2006 |
| KR | 10-2011-014844 | 2/2011 |
| KR | 10-2011-0124664 | 11/2011 |
| KR | 10-1101606 | 1/2012 |
| KR | 10-2012-0016935 | 2/2012 |
| WO | WO 2006/118407 | 11/2006 |

OTHER PUBLICATIONS

Korean Office Action mailed Dec. 24, 2013 in corresponding Korean Application No. 10-2012-0151453.

* cited by examiner

*Primary Examiner* — Will J Klimowicz (57) ABSTRACT

There is provided a spindle motor including a sleeve rotatably supporting a shaft, a rotor coupled to an upper end of the shaft and rotating together with the shaft, a stopper part coupled to a main wall part protruding from one surface of the rotor and facing an outer peripheral surface of the sleeve, a cover plate coupled to the sleeve while maintaining a clearance between the cover plate and lower portions of the shaft and the sleeve, a base member coupled to the cover plate, and a stator holder fixedly disposed on the base member.

8 Claims, 6 Drawing Sheets

SPINDLE MOTOR AND HARD DISK DRIVE INCLUDING THE SAME

CROSS-REFERENCE TO RELATED APPLICATIONS

This application claims the priority of Korean Patent Application No. 10-2012-0151453 filed on Dec. 21, 2012, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

A hard disk drive (HDD), an information storage device, reads data stored on a disk or writes data to a disk using a read/write head.

The hard disk drive requires a disk drive capable of driving the disk. In the disk drive, a spindle motor is used.

The spindle motor has used a hydrodynamic bearing assembly. A shaft, a rotating member of the hydrodynamic bearing assembly, and a sleeve, a fixed member thereof, have lubricating fluid interposed therebetween, such that the shaft is supported by fluid pressure generated in the lubricating fluid.

Here, increases in the capacity of spindle motors and the thinning thereof have been gradually demanded. In accordance with thinness and miniaturization of spindle motors, bearing rigidity has been naturally weakened.

Bearing rigidity, an important factor in determining rotational characteristics of the spindle motor, is affected by an interval between dynamic pressure grooves, that is, a bearing span length.

That is, as the bearing span length increases, bearing rigidity increases, such that rotational characteristics of the spindle motor may be improved. Therefore, even in the case that capacity of the spindle motor is increased and the spindle motor is thinned, bearing rigidity should not be effected.

In addition, the lubricating fluid injected into the hydrodynamic bearing assembly may be leaked to the outside due to an impact or may be evaporated, such that an amount of lubricating fluid in a bearing may be decreased. Due to the above-mentioned phenomenon, the hydrodynamic bearing may not generate sufficient pressure, such that a limitation in terms of performance and a lifespan of the spindle motor may occur.

Therefore, research into technology allowing for bearing rigidity to be maintained in spite of promoting an increase in a capacitor of a spindle motor and thinness of the spindle motor, improving rigidity of the spindle motor so that an internal component of the spindle motor is not deformed even in the case that an external impact, or the like, is applied to the spindle motor, and securing a storage space for lubricating fluid to significantly increase performance and a lifespan of the spindle motor has been urgently demanded.

SUMMARY OF THE INVENTION

An aspect of the present invention provides a spindle motor capable of having increased rigidity, improving bearing rigidity despite being miniaturized and thinned, preventing leakage of lubricating fluid, and having an increased effective lifespan, and a hard disk drive including the same.

An aspect of the present invention also provides a spindle motor capable of being manufactured in a simplified process and being manufactured at low cost by decreasing the amount of internal components included therein, and a hard disk drive including the same.

According to an aspect of the present invention, there is provided a spindle motor including: a sleeve rotatably supporting a shaft; a rotor coupled to an upper end of the shaft and rotating together with the shaft; a stopper part coupled to a main wall part protruding from one surface of the rotor and facing an outer peripheral surface of the sleeve; a cover plate coupled to the sleeve while maintaining a clearance between the cover plate and lower portions of the shaft and the sleeve; a base member coupled to the cover plate; and a stator holder fixedly disposed on the base member, wherein the cover plate includes a closing part disposed below the shaft and the sleeve, a fixing part extended from the closing part in an axial direction and coupled to an outer peripheral surface of the sleeve, and a bent part extended from the fixing part so as to be coupled to the stator holder.

The bent part may be disposed to face the stopper part.

The stopper part and the bent part may have lubricating fluid sealed therebetween.

A lower surface of the stopper part and a surface of the bent part facing the lower surface of the stopper part may be inclined such that lubricating fluid is sealed therebetween.

The base member may include a disk part and a coupling part extended from an inner edge of the disk part upwardly in the axial direction, and an inner peripheral surface of the coupling part is coupled to an outer peripheral surface of the fixing part.

The stator holder may include an inclined part protruding from one surface thereof in an inner diameter direction so as to be coupled to the bent part.

The inclined part may have an inclined surface to which the bent part is coupled.

According to another aspect of the present invention, there is provided a spindle motor including: a shaft including a body part and an extension part extended from an upper portion of the body part in an outer diameter direction; a sleeve rotatably supporting the shaft; a rotor including a hub base coupled to the extension part so as to be rotatable together with the shaft and a stopper part extended from the hub base so as to face an outer peripheral surface of the sleeve; a cover plate coupled to the sleeve while maintaining a clearance between the cover plate and lower portions of the shaft and the sleeve; and a base member fixed to the cover plate, wherein the cover plate includes a closing part disposed below the shaft and the sleeve and a fixing part extended from the closing part in an axial direction and disposed between the sleeve and the base member.

One surface of the stopper part and one surface of the fixing part may face each other.

Surfaces of the stopper part and the fixing part facing each other may be inclined.

The stopper part and the fixing part may have lubricating fluid sealed therebetween.

The shaft may further include a protrusion part extended from an outer edge of the extension part in the axial direction, the extension part and the protrusion part being coupled to the rotor.

According to another aspect of the present invention, there is provided a hard disk drive including: a spindle motor, having various features or aspects of that spindle motor as described above, that rotates a disk by power applied thereto through a board; a magnetic head writing data to the disk and reproducing data from the disk; and a head driving part moving the magnetic head to a predetermined position above the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1:
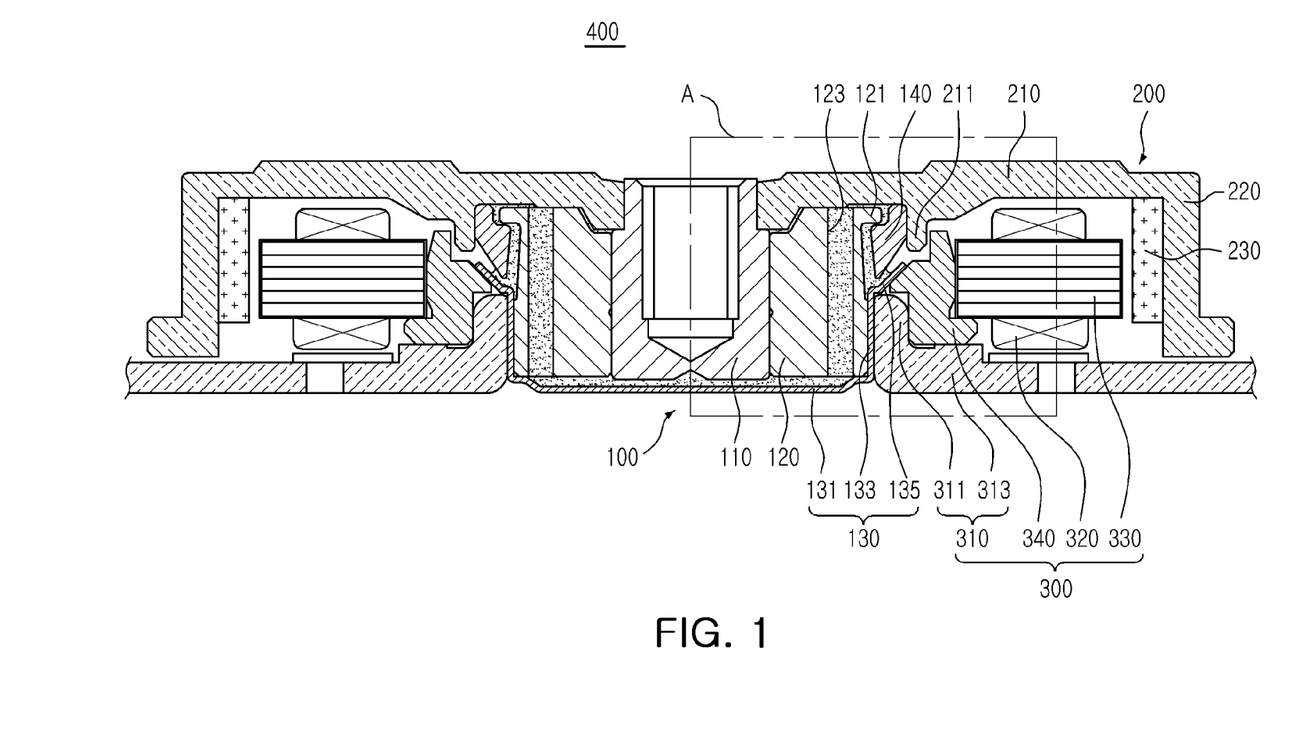
FIG. 1 is a schematic cross-sectional view of a spindle motor according to a first embodiment of the present invention.
Figure 2:
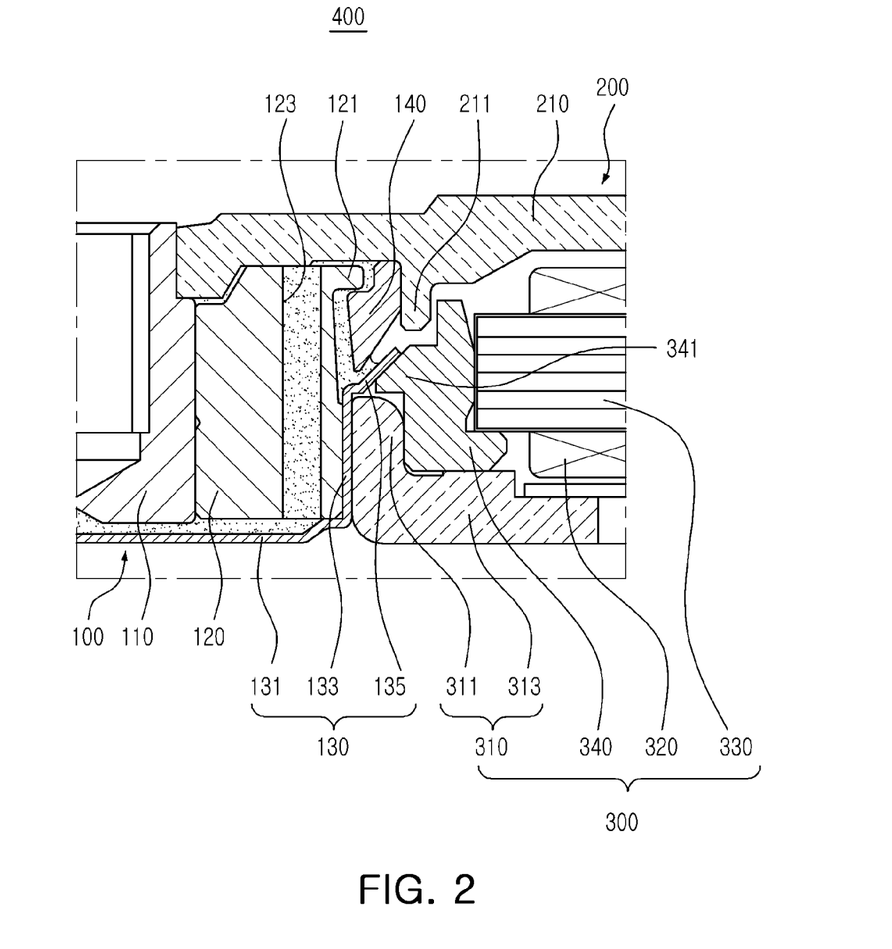
FIG. 2 is an enlarged cross-sectional view of portion A of FIG. 1.

FIG. 1 is a schematic cross-sectional view of a spindle motor according to a first embodiment of the present invention; FIG. 2 is an enlarged cross-sectional view of portion A of FIG. 1; and FIG. 3 is a half cross-sectional view of a spindle motor showing a modified example of a cover plate of the spindle motor according to the first embodiment of the present invention.

Figure 3:
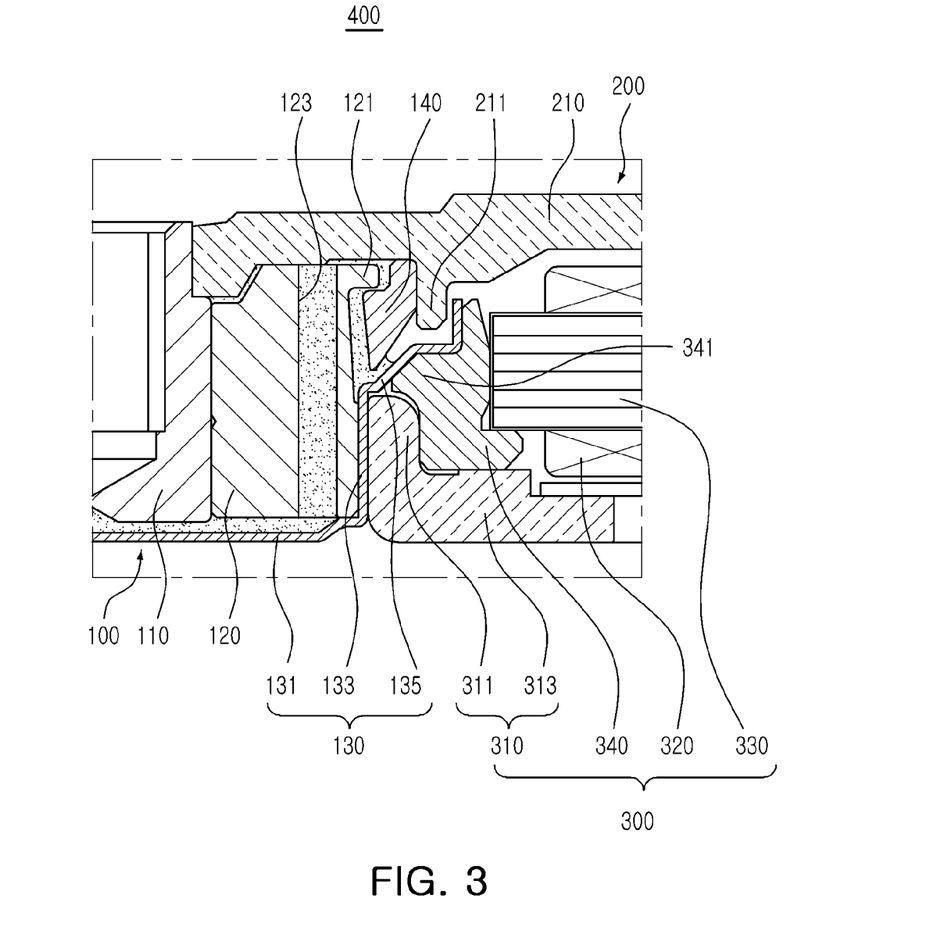
FIG. 3 is a half cross-sectional view of a spindle motor showing a modified example of a cover plate of the spindle motor according to the first embodiment of the present invention.

Referring to FIGS. 1 through 3, a spindle motor 400 according to the first embodiment of the present invention may include a hydrodynamic bearing assembly 100, a stator 300, a fixed member, and a rotor 200, a rotating member.

Terms with respect to directions will be first defined. As viewed in FIG. 1, an axial direction refers to a vertical direction based on the shaft 110, and an outer diameter or inner diameter direction refers to a direction towards an outer edge of the rotor 200 based on the shaft 110 or a direction towards the center of the shaft 110 based on the outer edge of the rotor 200.

The hydrodynamic bearing assembly 100 may include a shaft 110, a sleeve 120, and a cover plate 130.

The shaft 110 may be a rotating member rotating together with the rotor 200.

The shaft 110 may be inserted into a shaft hole of the sleeve 120 such that an upper end thereof protrudes, and the rotor 200 may be coupled to the upper end of the shaft 110 to thereby rotate together with the shaft 110.

The sleeve 120 may rotatably support the shaft 110 and be formed by forging Cu or Al or sintering Cu—Fe based alloy powder or SUS based powder.

In this configuration, the shaft 110 may be inserted into the shaft hole of the sleeve 120 so as to have a micro clearance between the shaft 110 and the shaft hole of the sleeve 120. The micro clearance may be filled with lubricating fluid, and rotation of the shaft 110 may be more smoothly supported by a radial dynamic pressure groove (not shown) formed in at least one of an outer peripheral surface of the shaft 110 and an inner peripheral surface of the sleeve 120.

The radial dynamic pressure groove (not shown) may be formed in an inner peripheral surface of the sleeve 120, an inner portion of the shaft hole of the sleeve 120, and generate pressure in such a manner that the shaft 110 may smoothly rotate in a state in which the shaft 110 is spaced apart from the inner peripheral surface of the sleeve 120 by a predetermined interval during rotation thereof.

However, the radial dynamic pressure groove (not shown) is not limited to being formed in the inner peripheral surface of the sleeve 120 as described above, but may also be formed in the outer peripheral surface of the shaft 110. In addition, the number of radial dynamic pressure grooves is not limited.

Here, the radial dynamic pressure groove (not shown) may have at least one of a herringbone shape, a spiral shape, and a screw shape. However, the radial dynamic pressure groove may have any shape as long as radial dynamic pressure may be generated.

In addition, a thrust dynamic pressure groove (not shown) may be formed in at least one of an upper surface of the sleeve 120 and one surface of the rotor 200 facing the upper surface of the sleeve 120. The shaft 110 may rotate together with the rotor 200 while having predetermined floating force due to the thrust dynamic pressure groove (not shown).

Here, the thrust dynamic pressure groove (not shown) may be a groove having a herringbone shape, a spiral shape, or a screw shape, similar to the radial dynamic pressure groove (not shown). However, the thrust dynamic pressure groove (not shown) is not necessarily limited to having the above-mentioned shape, but may have any shape as long as it may provide thrust dynamic pressure.

In addition, the sleeve 120 may have at least one bypass channel 123 formed therein so as to allow upper and lower portions thereof to be in communication with each other.

The bypass channel 123 may disperse pressure of the lubricating fluid to maintain balance in the pressure and move air bubbles, or the like, present in the lubricating fluid so as to be discharged through circulation.

The cover plate 130 may be coupled to the sleeve 120 while maintaining a clearance between the cover plate 130 and lower portions of the shaft 110 and the sleeve 120.

The cover plate 130 may receive the lubricating fluid in the clearance formed between the cover plate 130 and the sleeve 120 to support a lower surface of the shaft 110.

Here, as a method of fixing the cover plate 130, there may be several possible methods, such as a welding method, a caulking method, a bonding method, or the like, which may be selectively used according to a structure and a manufacturing process of a product.

A detailed shape of the cover plate 130 will be described below.

The stator 300 may include a coil 320, a core 330, and a base member 310, and a stator holder 340.

The stator 300 may be a fixed structure including the core 330 having the coil 320 wound therearound, and the coil 320 generates electromagnetic force having a predetermined magnitude during the application of power.

The core 330 may be fixedly disposed on an upper portion of the base member 310 on which a printed circuit board (not shown) having pattern circuits printed thereon is provided, a plurality of coil holes having a predetermined size may be formed in an upper surface of the base member 310 corresponding to the core 330 having the coil 320 wound therearound so as to penetrate through the base member 310 in order to expose the coil 320 downwardly, and the coil 320 may be electrically connected to the printed circuit board (not shown) so that external power may be supplied thereto.

The base member 310 may include a disk part 313 and a coupling part 311 extended from an inner edge of the disk part 313 in the axial direction.

The coupling part 311 may be fixedly coupled to the cover plate 130.

The base member 310 may be manufactured by die-casting aluminum (Al) or may be manufactured by performing plastic working (for example, press working) on a steel sheet.

That is, the base member 310 may be manufactured by performing plastic deformation on a sheet, that is, a cold rolled steel sheet (SPCC, SPCE, or the like), a hot rolled steel sheet, stainless steel, or lightweight alloy steel sheet such as a boron or magnesium alloy, or the like.

The stator holder 340 may be fixedly coupled to the base member 310 and have the core 330 seated on one surface thereof.

More specifically, one surface of the stator holder 340 may have a portion formed in a stepped manner, and the core 330 may be seated on the stepped portion of the stator holder 340.

The rotor 200 may be a rotating structure provided to be rotatable with respect to the stator 300 and include an annular ring-shaped magnet 230 disposed on an inner peripheral surface thereof, and the annular ring-shaped magnet 230 corresponds to the core 330, having a predetermined interval therebetween.

Here, the rotor 200 may include a hub base 210 coupled and fixed to the shaft 110 and a magnet supporting part 220 bent from the hub base 210 downwardly in the axial direction and supporting the magnet 230.

In addition, as the magnet 230, a permanent magnet generating magnetic force having a predetermined strength by alternately magnetizing an N pole and an S pole thereof in a circumferential direction may be used.

Rotational driving of the rotor 200 will be schematically described. When power is supplied to the coil 320 wound around the core 330, driving force capable of rotating the rotor 200 may be generated by electromagnetic interaction between the magnet 230 and the core 330 having the coil 320 wound therearound.

Therefore, the rotor 200 rotates, such that shaft 110 to which the rotor 200 is fixedly coupled may rotate together with the rotor 200.

The rotor 200 may be provided with a main wall part 211 protruding from one surface thereof downwardly in the axial direction.

The main wall part 211 may have a stopper part 140 coupled to an inner peripheral surface thereof, and an inner peripheral surface of the stopper part 140 and an outer peripheral surface of the sleeve 120 may be disposed to face each other.

The inner peripheral surface of the stopper part 140 and the outer peripheral surface of the sleeve 120 may be tapered.

In addition, the upper portion of the sleeve 120 may be provided with a flange part 121 protruding in the outer diameter direction, and a lower surface of the flange part 121 may face a portion of an upper surface of the stopper part 140.

Therefore, in the case in which the shaft 110 and the rotor 200, which are rotating members, are excessively floated, a portion of the upper surface of the stopper part 140 is caught by the lower surface of the flange part 121, whereby the excessive floating of the rotating member may be prevented.

The cover plate 130 may include a closing part 131 disposed below the shaft 110 and the sleeve 120, a fixing part 133 extended from the closing part 131 in the axial direction and coupled to the output peripheral surface of the sleeve 120, and a bent part 135 extended from the fixing part 133 so as to be coupled to the stator holder 340.

The closing part 131 may be disposed so as to maintain a clearance between the closed part 131 and the lower portions of the shaft 110 and the sleeve 120, and the fixed part 133 may be extended from the closing part 131 in the axial direction.

The fixing part 133 may be coupled to the outer peripheral surface of the sleeve 120 to fix the sleeve 120.

More specifically, an inner peripheral surface of the fixing part 133 and the outer peripheral surface of the sleeve 120 may be coupled to each other by at least one of a sliding method, an adhering method, a welding method, and a press-fitting method.

In addition, the fixed part 133 may be coupled to an inner peripheral surface of the coupling part 311 of the base member 310, and an outer peripheral surface of the fixing part 133 and the inner peripheral surface of the coupling part 311 may be coupled to each other by a sliding method, an adhering method, a welding method, and a press-fitting method.

That is, the fixing part 133 may be disposed between the sleeve 120 and the base member 310.

The bent part 135 may be extended from the fixing part 133 and be coupled to the stator holder 340.

Therefore, the cover plate 130 may be provided as a fixed member supporting the rotating members, together with the sleeve 120 and the base member 310.

The stator holder 340 may include an inclined part 341 protruding from one surface thereof in the inner diameter direction so as to be coupled to the bent part 135.

In addition, the inclined part 341 may have an inclined surface to which the bent part 135 is coupled.

Meanwhile, as shown in FIG. 3, the bent part 135 may have a shape corresponding to an inner peripheral surface of the stator holder 340 and include the inclined part 341 to thereby be coupled to the stator holder 340 along the inner peripheral surface of the stator holder 340.

Here, the bent part 135 may be disposed to face the stopper part 140, and the bent part 135 and the stopper part 140 may have the lubricating fluid sealed therebetween.

Therefore, a lower surface of the stopper part 140 and a surface of the bent part 135 facing the lower surface of the stopper part 140 may be inclined so that the lubricating fluid is sealed therebetween.

The amount of lubricating fluid may be gradually decreased due to factors such as leakage, evaporation, or the like, during driving of the spindle motor. Therefore, sufficient fluid pressure may be not provided, having a serious effect on the driving of the spindle motor.

However, in the spindle motor 400 according to the first embodiment of the present invention, since the lubricating fluid is sealed between the lower surface of the stopper part 140 and the surface of the bent part 135 facing the lower surface of the stopper part 140, a storage space of the lubricating fluid may be sufficiently secured. As a result, a lifespan of the spindle motor may be increased.

In addition, even though an interface of the lubricating fluid moves to a space between the outer peripheral surface of the sleeve 120 and the inner peripheral surface of the stopper part 140 due to evaporation of the lubricating fluid, since the outer peripheral surface of the sleeve 120 and the inner peripheral surface of the stopper part 140 are tapered, the lubricating fluid may also be sealed between the outer peripheral surface of the sleeve 120 and the inner peripheral surface of the stopper part 140.

In addition, even in the case that the lubricating fluid is separated from the interface due to an external impact, or the like, it may be resealed by inclined structures of the lower surface of the stopper part 140 and the surface of the bent part 135 facing the lower surface of the stopper part 140.

Therefore, the leakage of the lubricating fluid may be effectively prevented.

Here, the cover plate 130 may be formed by plastically deforming an iron based steel sheet. More specifically, after a basic shape of the cover plate 130 is formed by press working, a final shape thereof may be manufactured by bending or cutting, additional working.

That is, the cover plate 130 according to the embodiment of the present invention may be manufactured by performing a single process through plastic working such as press working, or the like, or an additional process on a cold rolled steel sheet (SPCC, SPCE, or the like), a hot rolled steel sheet, stainless steel, a lightweight alloy steel sheet such as a boron or magnesium alloy, or the like.

Therefore, the cover plate 130 according to the embodiment of the present invention significantly decreases a required processing time and energy consumption, whereby production capability may be improved.

In addition, since the cover plate 130 is manufactured using an iron-based steel sheet or alloy, the overall rigidity of the spindle motor may be improved.

Since the fixing part 133 of the cover plate 130 is disposed between the sleeve 120 and the base member 310, even in the case that a load in the axial direction or a radial direction or an external impact occurs, the fixing part 133 of the cover plate 130 supports the sleeve 120 and the base member 310, whereby deformation of an internal component may be prevented.

Figure 4:
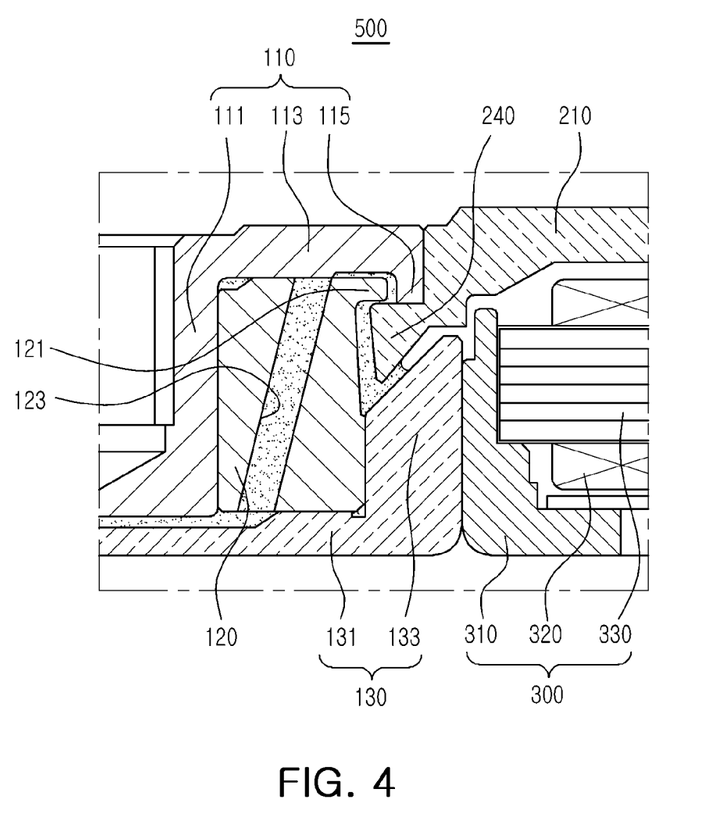
FIG. 4 is a half cross-sectional view of a spindle motor according to a second embodiment of the present invention.

FIG. 4 is a half cross-sectional view of a spindle motor according to a second embodiment of the present invention.

Referring to FIG. 4, a spindle motor 500 according to the second embodiment of the present invention is the same as the spindle motor 400 according to the first embodiment of the present invention except for the shaft 110, the rotor 200, and the cover plate 130. Therefore, a description of components other than the shaft 110, the rotor 200, and the cover plate 130 will be omitted.

The shaft 110 may include a body part 111 inserted into the shaft hole of the sleeve 120 and an extension part 113 extended from an upper end of the body part 111 in the outer diameter direction.

Here, the extension part 113 may formed such that an outer edge thereof is formed outwardly the outer peripheral surface of the sleeve 120 in the outer diameter direction and coupled to the rotor 200.

Therefore, the extension part 113 and the rotor 200 may be coupled to each other on the outer side of the outer peripheral surface of the sleeve 120 in the outer direction.

In this configuration, the shaft 110 may further include a protrusion part 115 extended from the outer edge of the extension part 113 in the axial direction so as to increase a coupled area between the shaft 110 and the rotor 200.

That is, since an outer peripheral surface of the extension part 113 and an outer peripheral surface and a low surface of the protrusion part 115 come into contact with the rotor 200 and are coupled to the rotor 200, a coupled area between the shaft 110 and the rotor 200 may be increased, and coupling force between the shaft 110 and the rotor 200 may be improved.

Therefore, since the shaft 110 and the rotor 200 may be stably coupled to each other, rigidity of the spindle motor may be improved.

The rotor 200 may be provided with a stopper part 240 extended from the hub base 210 so as to be disposed to face the outer peripheral surface of the sleeve 120.

Since the rotor 200 and the stopper part 240 are formed integrally with each other, the number of internal components of the spindle motor is decreased, whereby a manufacturing process of the spindle motor may be simplified and manufacturing costs of the spindle motor may be decreased.

The cover plate 130 may include the closing part 131 disposed below the shaft 110 and the sleeve 120 and the fixing part 133 extended from the closing part 131 in the axial direction and coupled to the sleeve 120 and the base member 310.

The closing part 131 may be disposed so as to maintain the clearance between the closed part 131 and the lower portions of the shaft 110 and the sleeve 120, and the fixed part 133 may be extended from the closing part 131 in the axial direction.

The fixing part 133 may be coupled to the outer peripheral surface of the sleeve 120 and the inner peripheral surface of the base member 310 to fix the sleeve 120.

That is, the fixing part 133 may be disposed between the sleeve 120 and the base member 310, and the cover plate 130 including the fixing part 133 may be provided as a fixed member supporting, together with the sleeve 120 and the base member 310, the rotation of the rotating member.

An upper surface of the fixing part 133 may face a lower surface of the stopper part 240, and the upper surface of the fixing part 133 and the lower surface of the stopper part 240 may have the lubricating fluid sealed therebetween.

Therefore, the upper surface of the fixing part 133 and the lower surface of the stopper part 240 may be inclined so that the lubricating fluid is sealed therebetween.

Meanwhile, in the spindle motor 500 according to the second embodiment of the present invention, the core 330 having the coil 320 wound therearound may be fixedly disposed on the base member 310.

Figure 5:
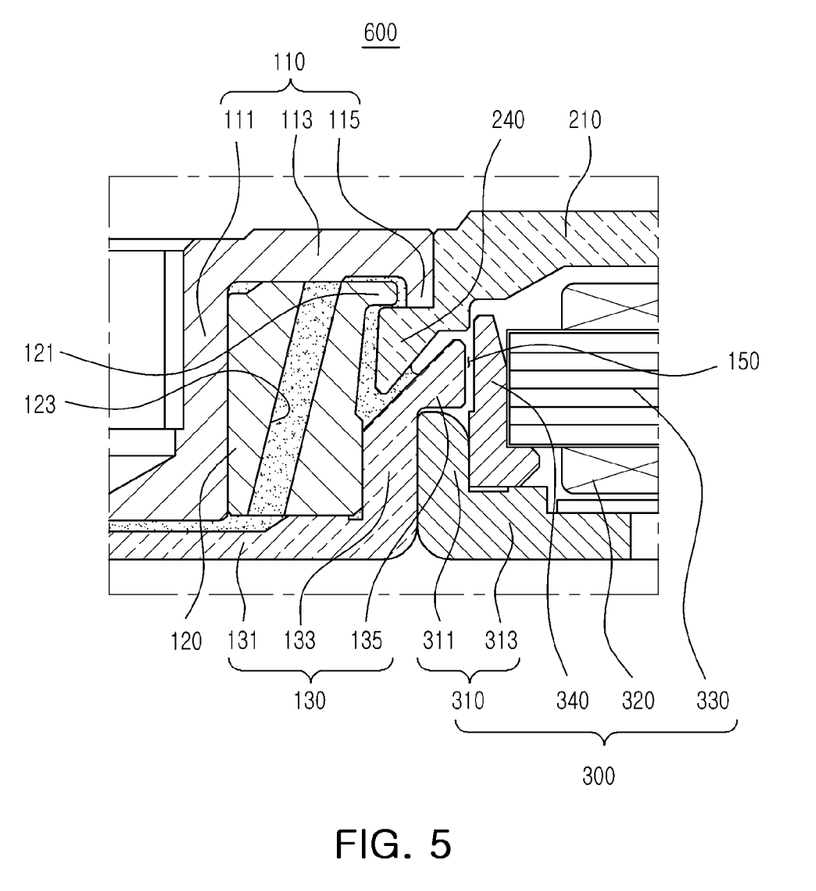
FIG. 5 is a half cross-sectional view of a spindle motor according to a third embodiment of the present invention.

FIG. 5 is a half cross-sectional view of a spindle motor according to a third embodiment of the present invention.

Referring to FIG. 5, a spindle motor 600 according to the third embodiment of the present invention is the same as the spindle motor 500 according to the second embodiment of the present invention except for the base member 310, the cover plate 130, and the stator holder 340. Therefore, a description of components other than the base member 310, the cover plate 130, and the stator holder 340 will be omitted.

The base member 310 may include the disk part 313 and the coupling part 311 extended from an inner edge of the disk part 313 in the axial direction.

The coupling part 311 may be fixedly coupled to the cover plate 130.

The base member 310 may be manufactured by die-casting an aluminum (Al) material or may be manufactured by performing plastic working (for example, press working) on a steel sheet.

That is, the base member 310 may be manufactured by performing plastic deformation on a sheet, that is, a cold rolled steel sheet (SPCC, SPCE, or the like), a hot rolled steel sheet, stainless steel, or lightweight alloy steel sheet such as a boron or magnesium alloy, or the like.

The spindle motor 600 according to the third embodiment of the present invention may include the stator holder 340 to which the core 330 having the coil 320 wound therearound is fixedly coupled.

The stator holder 340 may be fixed to the base member 310 such that a portion thereof protrudes upwardly higher than an upper surface of the coupling part 311 of the base member 310.

Meanwhile, the cover plate 130 of the spindle motor 600 according to the third embodiment of the present invention may further include the bent part 135 extended from the upper end of the fixing part 133 in the outer diameter direction.

An outer peripheral surface of the bent part 135 may face the inner peripheral surface of the stator holder 340.

More specifically, the inner peripheral surface of the stator holder 340 protruding upwardly higher than the upper surface of the coupling part 311 of the base member 310 may face the outer peripheral surface of the bent part 135.

Therefore, a microclearance is between the outer peripheral surface of the bent part 135 and the inner peripheral surface of the stator holder 340, whereby a labyrinth sealing part 150 may be formed.

Therefore, a sealing effect of the lubricating fluid may be improved by the labyrinth sealing part 150.

More specifically, the labyrinth sealing part 150 may suppress air contained in the evaporated lubricating fluid from being leaked to the outside to prevent the lubricating fluid from being decreased and prevent external foreign materials from being introduced.

Figure 6:
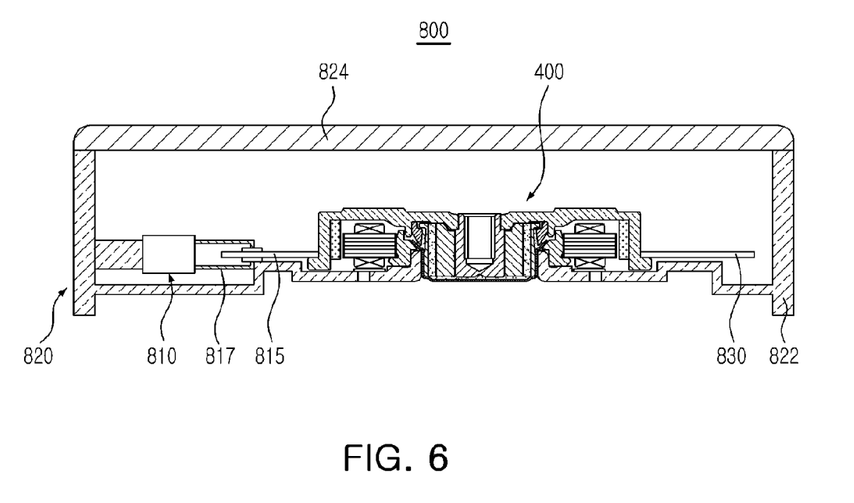
FIG. 6 is a schematic cross-sectional view of a disk drive using the spindle motor according to an embodiment of the present invention.

FIG. 6 is a schematic cross-sectional view of a disk drive using the spindle motor according to the embodiment of the present invention.

Referring to FIG. 6, a recording disk drive 800 having the spindle motor according to the embodiment of the present invention mounted therein may be a hard disk drive and may include the spindle motor 400, a head driving part 810, and a housing 820.

The spindle motor 400 may have all characteristics of the spindle motor 400 according to the embodiment of the present invention described above and have a recording disk 830 mounted thereon.

The head driving part 810 may transfer a magnetic head 815 detecting information stored on the recording disk 830 mounted in the spindle motor 400 to a surface of the recording disk 830 from which the information is to be detected.

Here, the magnetic head 815 may be disposed on a support part 817 of the head driving part 810.

The housing 820 may include a motor mounting plate 822 and a top cover 824 shielding an upper portion of the motor mounting plate 822 in order to form an internal space receiving the spindle motor 400 and the head driving part 810 therein.

The spindle motor according to the embodiments of the present invention described above may have the rigidity of the spindle motor, increase a bearing span length while satisfying demands for miniaturization and thinness, and include the labyrinth sealing part to prevent the leakage of the lubricating fluid and introduction of external foreign materials.

As set forth above, with the spindle motor according to the embodiment of the present invention, the rigidity of the spindle motor may be improved, and the bearing rigidity may be improved while implementing the miniaturization and the thinness of the spindle motor.

In addition, the leakage of the lubricating fluid may be prevented, and the lifespan of the spindle motor may be increased.

Further, the number of internal components of the spindle motor is decreased, whereby a manufacturing process of the spindle motor may be simplified and a manufacturing cost of the spindle motor may be decreased.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
   a sleeve rotatably supporting a shaft;
   a rotor coupled to an upper end of the shaft and rotating together with the shaft;
   a stopper part coupled to a main wall part protruding from one surface of the rotor and facing an outer peripheral surface of the sleeve;
   a cover plate coupled to the sleeve while maintaining a clearance between the cover plate and lower portions of the shaft and the sleeve;
   a base member coupled to the cover plate; and
   a stator holder fixedly disposed on the base member,
   wherein the cover plate includes a closing part disposed below the shaft and the sleeve, a fixing part extended from the closing part in an axial direction and coupled to an outer peripheral surface of the sleeve, and a bent part extended from the fixing part so as to be coupled to the stator holder.

2. The spindle motor of claim 1, wherein the bent part is disposed to face the stopper part.

3. The spindle motor of claim 1, wherein the stopper part and the bent part have lubricating fluid sealed therebetween.

4. The spindle motor of claim 1, wherein a lower surface of the stopper part and a surface of the bent part facing the lower surface of the stopper part are inclined such that lubricating fluid is sealed therebetween.

5. The spindle motor of claim 1, wherein the base member includes a disk part and a coupling part extended from an inner edge of the disk part upwardly in the axial direction, and an inner peripheral surface of the coupling part is coupled to an outer peripheral surface of the fixing part.

6. The spindle motor of claim 1, wherein the stator holder includes an inclined part protruding from one surface thereof in an inner diameter direction so as to be coupled to the bent part.

7. The spindle motor of claim 6, wherein the inclined part has an inclined surface to which the bent part is coupled.

8. A hard disk drive comprising:
   the spindle motor of claim 1 rotating a disk by power applied thereto through a board;
   a magnetic head writing data to the disk and reproducing data from the disk; and
   a head driving part moving the magnetic head to a predetermined position above the disk.

* * * * *